US011680811B2

(12) United States Patent
Takahashi et al.

(10) Patent No.: US 11,680,811 B2
(45) Date of Patent: Jun. 20, 2023

(54) VEHICLE POSITION GUIDANCE SYSTEM AND VEHICLE POSITION GUIDANCE METHOD

(71) Applicant: TOYODA GOSEI CO., LTD., Kiyosu (JP)

(72) Inventors: Kazuhisa Takahashi, Kiyosu (JP); Tadaoki Ichikawa, Kiyosu (JP); Akihiro Misawa, Kiyosu (JP); Shinji Oguchi, Kiyosu (JP); Bunpei Morita, Kiyosu (JP); Hitoshi Horibe, Kiyosu (JP); Takeshi Kondo, Kiyosu (JP); Tasuku Ishihara, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 282 days.

(21) Appl. No.: 17/278,476

(22) PCT Filed: Sep. 10, 2019

(86) PCT No.: PCT/JP2019/035438
§ 371 (c)(1),
(2) Date: Mar. 22, 2021

(87) PCT Pub. No.: WO2020/066580
PCT Pub. Date: Apr. 2, 2020

(65) Prior Publication Data
US 2022/0034672 A1 Feb. 3, 2022

(30) Foreign Application Priority Data

Sep. 28, 2018 (JP) ................ JP2018-184362

(51) Int. Cl.
*G01C 21/34* (2006.01)
*G08G 1/09* (2006.01)
(Continued)

(52) U.S. Cl.
CPC .......... *G01C 21/3476* (2013.01); *B60Q 1/50* (2013.01); *B60W 30/06* (2013.01);
(Continued)

(58) Field of Classification Search
CPC .......... G01C 21/34; G01C 21/26; G08G 1/00; G08G 1/005; G08G 1/09; G08G 1/13; G09B 29/00; G09B 29/10
See application file for complete search history.

(56) References Cited

U.S. PATENT DOCUMENTS

2009/0043490 A1* 2/2009 Jung ................ G01S 19/14
701/533
2009/0187341 A1* 7/2009 Vavrus ............... G08G 1/14
701/414
(Continued)

FOREIGN PATENT DOCUMENTS

JP H05-328461 A 12/1993
JP 2004-118356 A 4/2004
(Continued)

OTHER PUBLICATIONS

International Search Report of the International Searching Authority dated Dec. 10, 2019 for the corresponding International application No. PCT/P2019/035438 (and English translation).

*Primary Examiner* — Tan Q Nguyen
(74) *Attorney, Agent, or Firm* — Posz Law Group, PLC (57) ABSTRACT

A vehicle position guidance system includes a terminal position measurement section, a vehicle position measurement section, a calculator, and a guide. The terminal position measurement section measures a position of a terminal carried by a user. The vehicle position measurement section measures a position of a parked vehicle. The calculator obtains a route using position information related to the terminal and position information related to the parked vehicle. The guide assists the user in entering the vehicle by (Continued)

selectively using a first guidance and a second guidance depending on whether a distance is long or short between the terminal and the parked vehicle on the route. The first guidance provides guidance to the position of the parked vehicle using the terminal. The second guidance provides guidance to the position of the parked vehicle through a notification using a vehicle on-board device of the parked vehicle.

11 Claims, 7 Drawing Sheets

(51) Int. Cl.
| | | |
|---|---|---|
| *B60Q 1/50* | (2006.01) | |
| *B60W 30/06* | (2006.01) | |
| *G01C 21/36* | (2006.01) | |
| *G01S 19/42* | (2010.01) | |
| *G08G 1/005* | (2006.01) | |
| *G08G 1/13* | (2006.01) | |

(52) U.S. Cl.
CPC .......... *G01C 21/3629* (2013.01); *G01S 19/42* (2013.01); *G08G 1/005* (2013.01); *G08G 1/09* (2013.01); *G08G 1/13* (2013.01); *B60Q 2400/50* (2013.01)

(56) References Cited

U.S. PATENT DOCUMENTS

| | | | |
|---|---|---|---|
| 2014/0232569 A1* | 8/2014 | Skinder | G08G 1/144 340/989 |
| 2016/0253748 A1* | 9/2016 | Levy | G08G 1/205 705/13 |

FOREIGN PATENT DOCUMENTS

| | | |
|---|---|---|
| JP | 2005-084714 A | 3/2005 |
| JP | 2011-086282 A | 4/2011 |
| JP | 2012-022478 A | 2/2012 |
| JP | 2013-148419 A | 8/2013 |
| JP | 2015-153145 A | 8/2015 |
| JP | 2006-145442 A | 6/2016 |
| JP | 2018-060372 A | 4/2018 |

* cited by examiner

VEHICLE POSITION GUIDANCE SYSTEM AND VEHICLE POSITION GUIDANCE METHOD

CROSS REFERENCE TO RELATED APPLICATION

This application is a U.S. national stage application of International Patent Application No. PCT/JP2019/035438 filed on Sep. 10, 2018, which claims priority to Japanese application no. JP 2018-184362 filed on Sep. 28, 2018, the contents of which are incorporated herein by reference.

BACKGROUND

The present disclosure relates to a vehicle position guidance system and a vehicle position guidance method that guide a user to a vehicle position.

Recent vehicle position guidance systems guiding a user to the position of a parked vehicle in a parking lot or the like include a typical technique that uses, for example, a global positioning system (GPS) or a network communication to send position information related to the vehicle to the terminal of the user, thereby providing the user with the guidance of a route to the parking position (refer to Patent Document 1).

PATENT DOCUMENTS

Patent Document 1: Japanese Laid-Open Patent Publication No. 2006-145442

However, in the technique disclosed in Patent Document 1, the guidance to the parking position is performed uniformly. Thus, proper guidance according to the distance between the current position of the user and the parked vehicle is not provided. This makes the guidance to the parking position confusing.

SUMMARY

It is an objective of the present disclosure is to provide a vehicle position guidance system and a vehicle position guidance method capable of providing proper guidance to a vehicle position.

A vehicle position guidance system that solves the above-described objective guides a user to a position of a parked vehicle. The vehicle position guidance system includes a terminal position measurement section that measures a position of a terminal carried by the user, a vehicle position measurement section that measures the position of the parked vehicle, a calculator that obtains a route for the user to reach the parked vehicle using position information related to the terminal measured by the terminal position measurement section and position information related to the parked vehicle measured by the vehicle position measurement section, a guide that assists the user in entering the vehicle by selectively using a first guidance and a second guidance depending on whether a distance is long or short between the terminal and the parked vehicle on the route that has been obtained by the calculator. The first guidance provides guidance to the position of the parked vehicle using the terminal. The second guidance provides guidance to the position of the parked vehicle through a notification using a vehicle on-board device of the parked vehicle.

In the above-described configuration, guidance to the parking position of the vehicle is provided by selectively performing the first guidance or the second guidance depending on whether the distance is long or short between the terminal carried by the user and the vehicle. This allows for a proper guidance corresponding to the distance between the vehicle and the terminal when providing guidance to the parking position of the vehicle. Accordingly, proper guidance to the vehicle position is achieved.

In the vehicle position guidance system, it is preferred that, after the user gets out of the vehicle, the vehicle autonomously locate a parking position and automatically travel to the parking position to proceed with parking.

In the above-described configuration, in a case where the vehicle autonomously travels to locate the parking position and park itself through automatic travel after the user gets out of the vehicle, the user is unable to recognize the parking position when attempting to return to the parked vehicle. However, the first guidance and the second guidance allow the user to reach the parking position of the vehicle.

In the vehicle position guidance system, it is preferred that the terminal position measurement section and the vehicle position measurement section measure their own positions using at least one of a network communication via a wireless LAN or a global positioning system that measures a position using radio waves from a satellite.

In the above-described configuration, the positions of the vehicle and the terminal are accurately measured using the global positioning system. Even if the vehicle and the terminal are located at the position where radio waves of the global positioning system cannot be received, the positions can be identified through the network communication via a wireless LAN. This is advantageous for correctly measuring the current positions of the vehicle and the terminal.

It is preferred that the vehicle position guidance system include an operating section that causes the parked vehicle to automatically travel to an entering position of the parked vehicle when the entering position is designated. The calculator preferably obtains a route to the entering position designated by the user and the guide guides the user to the entering position in accordance with the route to the entering position.

In the above-described configuration, the user enters the vehicle by designating the entering position of the vehicle and causing the vehicle to automatically travel to the entering position. This ensures the convenience for the user to enter the vehicle.

In the vehicle position guidance system, it is preferred that the operating section obtain an expected time at which the user will reach the entering position and cause the vehicle to automatically travel in accordance with the expected time.

In the above-described configuration, the time at which the parked vehicle will reach the entering position can be adjusted to the time at which the user will reach the entering position. If, for example, the parked vehicle reaches the entering position before the user reaches the entering position, the vehicle has to wait for some time, thereby resulting in the formation of the queue of the vehicles. The occurrence of such a situation is limited in the above-described configuration.

In the vehicle position guidance system, it is preferred that the first guidance be provided by at least one of a sound notification or a screen display in the terminal.

In the above-described configuration, the use of a sound notification or a screen display in the terminal allows the user to be readily notified of the approximate position of the parked vehicle.

In the vehicle position guidance system, it is preferred that the second guidance be provided through projection of an image using the vehicle on-board device.

In the above-described configuration, since the projected image of the vehicle on-board device of the vehicle allows its own position to become noticeable, the user immediately recognizes the vehicle position.

In the vehicle position guidance system, it is preferred that the guide check whether near-field communication between the vehicle and the terminal is established and perform, when the near-field communication is established, the second guidance to execute guidance through the projection of the image using the vehicle on-board device.

In the above-described configuration, the second guidance is executed when the vehicle and the terminal are located close to each other such that the near-field communication between the vehicle and the terminal is established. Accordingly, the second guidance is executed in an optimal situation where the user has arrived in the vicinity of the vehicle.

In the vehicle position guidance system, it is preferred that the projected image provided by the vehicle on-board device associate the terminal and the vehicle with each other.

In the above-described configuration, since the unique projected image set for each user is displayed. This is advantageous in allowing the user to readily find the parked vehicle.

It is preferred that the vehicle position guidance system include a registration section that manages registration of the projected image by the user.

In the above-described configuration, the user is able to set, for the vehicle on-board device, an image that he or she wants to project.

A vehicle position guidance method that achieves the above-described objective guides a user to a position of a parked vehicle. The vehicle position guidance method includes measuring a position of a terminal carried by the user, measuring the position of the parked vehicle, obtaining a route for the user to reach the parked vehicle using measured position information related to the terminal and measured position information related to the parked vehicle, and assisting the user in entering the vehicle by selectively using a first guidance and a second guidance depending on whether a distance is long or short between the terminal and the parked vehicle on the calculated route. The first guidance provides guidance to the position of the parked vehicle using the terminal. The second guidance provides guidance to the position of the parked vehicle through a notification using a vehicle on-board device of the parked vehicle.

The present disclosure allows for proper guidance to the vehicle position.

DETAILED DESCRIPTION OF THE PREFERRED EMBODIMENTS

A vehicle position guidance system and a vehicle position guidance method according to an embodiment will now be described with reference to FIGS. 1 to 10B.

Figure 1:
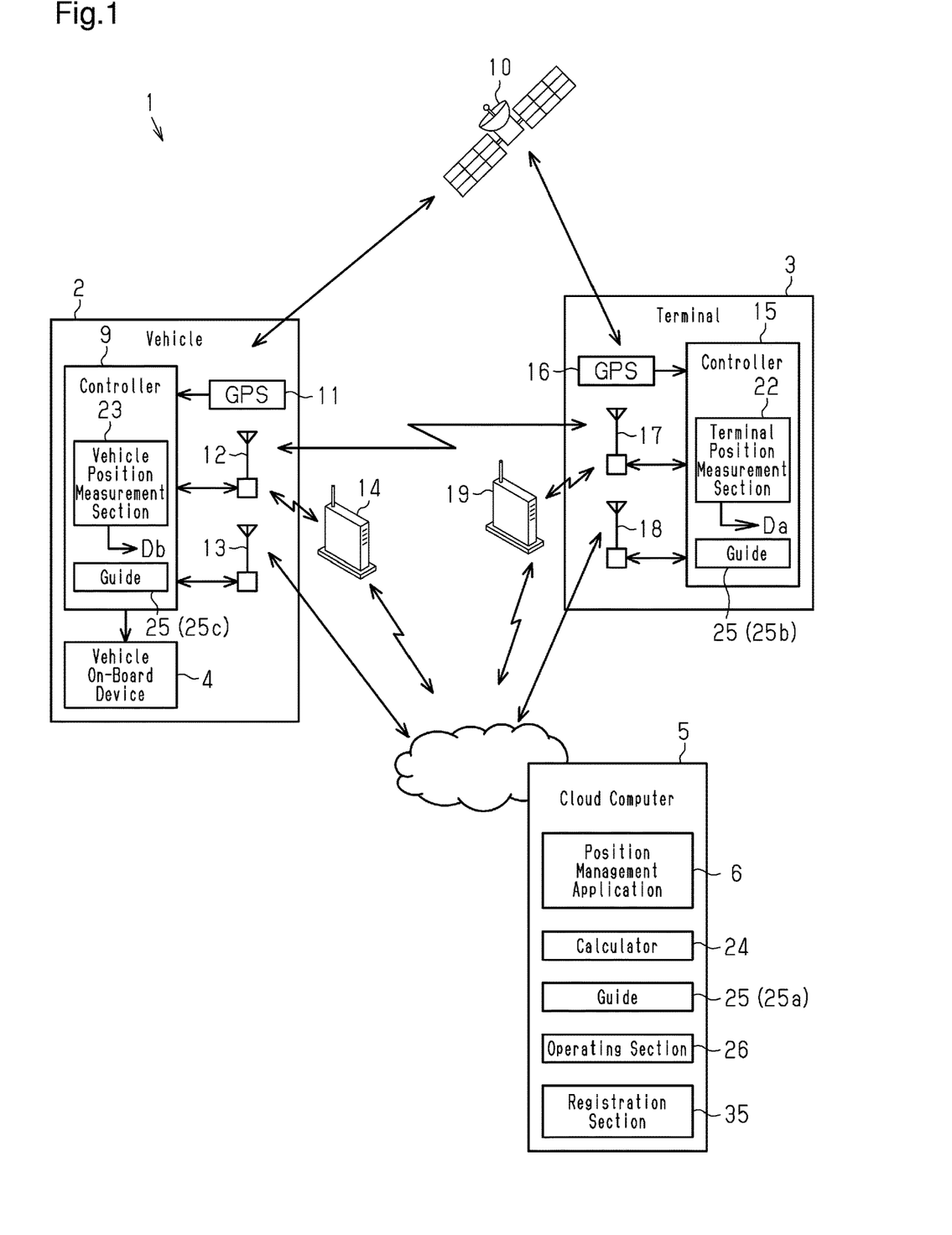
FIG. 1 is a diagram showing the configuration of a vehicle position guidance system according to an embodiment.

FIG. 1 shows a vehicle position guidance system 1. In a case where a vehicle 2 (hereinafter also referred to as parked vehicle 2) has been parked in, for example, a multi-story parking garage or a large parking lot, the vehicle position guidance system 1 is used to guide the user to the position of the parked vehicle 2 when he or she wants to reach the parked vehicle 2. The vehicle position guidance system 1 provides guidance to the approximate position of the parked vehicle 2 using a terminal 3 carried by the user. When the user has reached the vicinity of the parked vehicle 2, the vehicle position guidance system 1 informs the user of the position of the parked vehicle 2 by differentiating the parked vehicle 2 from another vehicle through a notification using a vehicle on-board device 4 of the vehicle 2. The vehicle 2 may be a manually-driven vehicle or may be a driverless vehicle. The terminal 3 is preferably, for example, a multi-functional mobile phone.

The vehicle position guidance system 1 guides the user to the position of the parked vehicle 2 via a cloud. In this case, the vehicle position guidance system 1 guides the user to the position of the parked vehicle 2 in collaboration with a cloud computer 5, which manages the cloud. In the present embodiment, the cloud computer 5 includes a position management application 6, which manages the positions of the vehicle 2 and the terminal 3. The position management application 6 is used to share various information related to the positions of the vehicle 2 and the terminal 3.

The vehicle 2 includes a controller 9, which controls the activation of the vehicle position guidance in the vehicle 2. The controller 9 is not limited to an electronic control unit (ECU) that has already been installed, and may be a new ECU mounted on the vehicle. The vehicle 2 includes a global positioning system (GPS) 11, which measures a position (vehicle position) using radio waves from a satellite 10, a near-field communication section 12, which performs near-field communication for the vehicle 2, and a network communication section 13, which performs a network communication for the vehicle 2. Near-field communication includes, for example, direct communication in which radio waves are directly transmitted and received between devices. Further, examples of near-field communication include communication through a wireless LAN using a relay 14 or the like. Direct communication includes, for example, Bluetooth (registered trademark) communication. Wireless LAN communication includes, for example, Wi-Fi communication. The generation of a network communication is not limited to 4G, and may be 5G.

The terminal 3 includes a controller 15, which controls the activation of the vehicle position guidance in the terminal 3. The controller 15 may include a hardware circuit and software (application) that have been provided in advance. The application may be, for example, an application that has been downloaded from a server or the like.

That is, each of the cloud computer 5, the controller 9 of the vehicle 2, and the controller 15 of the terminal 3 may be circuitry including: 1) one or more processors that operate according to a computer program (software); 2) one or more dedicated hardware circuits such as application specific integrated circuits (ASICs) that execute at least part of various processes; or 3) a combination thereof. The processor includes a CPU and memories such as a RAM and a ROM. The memories store program codes or commands configured to cause the CPU to execute processes. The memories, or computer readable media, include any type of media that are accessible by general-purpose computers and dedicated computers.

In the same manner as the vehicle 2, the terminal 3 includes a GPS 16, a near-field communication section 17, and a network communication section 18. The terminal 3 wirelessly communicates with the vehicle 2 through, for example, Bluetooth communication serving as near-field communication. Further, the near-field communication section 17 performs communication through a wireless LAN using a relay 19 or the like.

The vehicle position guidance system 1 includes a terminal position measurement section 22, which measures the position of the terminal 3 carried by the user. The terminal position measurement section 22 is arranged in the controller 15 of the terminal 3. The terminal position measurement section 22 uses at least one of the GPS 16 and a network communication through a wireless LAN (for example, Wi-Fi) to measure its own position (position information Da of the terminal 3). In the present embodiment, position measurement is enabled not only by the GPS 16 but also through Wi-Fi communication, so that the position of the terminal 3 is recognizable, for example, even inside a building where radio waves of the GPS 16 do not reach.

The vehicle position guidance system 1 includes a vehicle position measurement section 23, which measures the position of the parked vehicle 2. The vehicle position measurement section 23 is arranged in the controller 9 of the vehicle 2. The vehicle position measurement section 23 uses at least one of the GPS 11 and a network communication through a wireless LAN (for example, Wi-Fi) to measure its own position (position information Db of the vehicle 2). Thus, in the same manner as the terminal 3, position measurement is enabled not only by the GPS 11 but also through Wi-Fi communication, so that the position of the vehicle 2 is recognizable, for example, even inside a parking garage where radio waves of the GPS 11 do not reach.

The vehicle position guidance system 1 includes a calculator 24. The calculator 24 obtains a route R for the user to reach the vehicle 2 using the positional relationship between the vehicle 2 and the terminal 3. The calculator 24 is arranged in the cloud computer 5. The calculator 24 obtains the route R for the user to reach the parked vehicle 2, using the position information Da of the terminal 3 measured by the terminal position measurement section 22 and the position information Db of the vehicle 2 measured by the vehicle position measurement section 23. The route R is preferably, for example, a course (route) on the map of map data.

The vehicle position guidance system 1 includes a guide 25, which guides the user to the position of the vehicle 2 using the route R that has been obtained by the calculator 24.

The guide 25 includes a guide 25a in the cloud computer 5, a guide 25b in the terminal 3, and a guide 25c in the vehicle 2. The guide 25b of the terminal 3 is arranged in the controller 15. The guide 25c of the vehicle 2 is arranged in the controller 9.

The guide 25 assists the user in entering the vehicle by selectively using a first guidance and a second guidance depending on whether the distance is long or short between the terminal 3 and the parked vehicle 2 on the route R that has been obtained by the calculator 24. The first guidance provides guidance to the position of the parked vehicle 2 using the terminal 3. The second guidance provides guidance to the position of the parked vehicle 2 through a notification using the vehicle on-board device 4 of the parked vehicle 2. Thus, the guide 25 provides guidance to the approximate position of the parked vehicle 2 through the first guidance using the terminal 3 and assists with the final locating of the parked vehicle 2 through the second guidance using the vehicle on-board device 4. The approximate position includes, for example, the direction of the vehicle 2 and the approximate distance to the vehicle 2. The approximate position also shows on which floor the vehicle 2 is located in a parking garage. The first guidance is provided by at least one of a sound notification and a screen display in the terminal 3. The second guidance is provided through the projection of an image using the vehicle on-board device 4.

The vehicle position guidance system 1 includes an operating section 26. When the entering position of the parked vehicle 2 is designated, the operating section 26 causes the parked vehicle 2 to automatically travel to the entering position. The operating section 26 is arranged in the cloud computer 5. For example, when receiving a designation of the entering position of the parked vehicle 2 from the terminal 3, the operating section 26 commands the parked vehicle 2 to move to the entering position so that the parked vehicle 2 travels automatically. In this case, the calculator 24 obtains the route R to the entering position designated by the user. The guide 25 guides the user to the entering position in accordance with the route R.

The operation and advantages of the vehicle position guidance system 1 of the present embodiment will now be described with reference to FIGS. 2 to 10B.

Figure 2A:
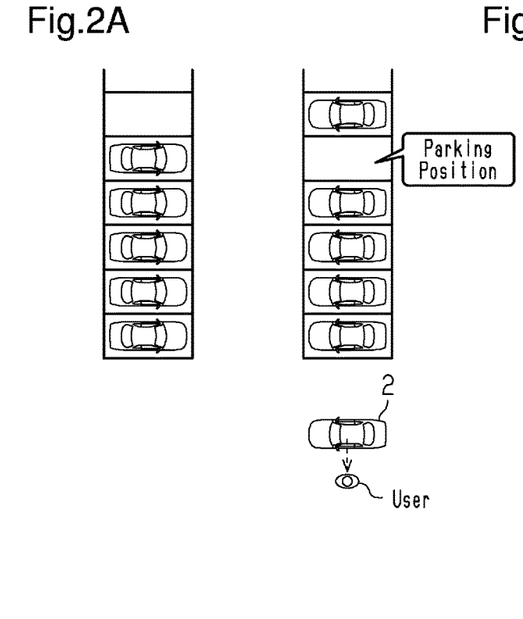
FIG. 2A is a diagram illustrating the user getting out of the vehicle.
Figure 2B:
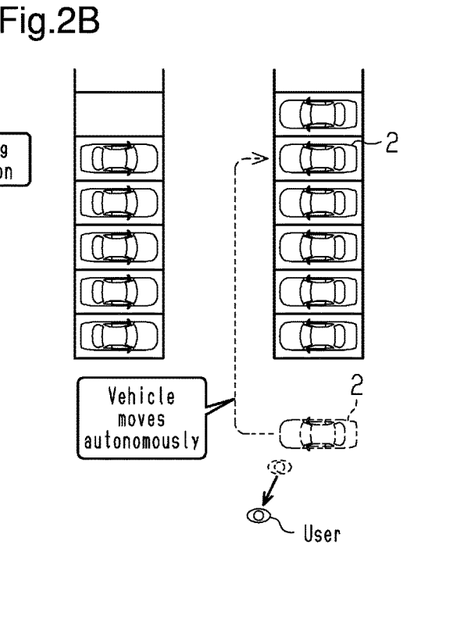
FIG. 2B is a diagram illustrating the vehicle autonomously moving toward the parking position through automatic travel after the user gets out of the vehicle.

As shown in FIGS. 2A and 2B, for example, in a case where the vehicle 2 is a driverless vehicle, after the user gets out of the vehicle 2, the vehicle 2 autonomously locates a parking position and automatically travels to the parking position to proceed with parking. The parked vehicle 2 can search for a vacant parking position by, for example, analyzing a captured image acquired with a vehicle on-board camera or receiving parking lot information from a communication device installed in a parking lot. In the case of automatic parking of the vehicle 2, when the user attempts to enter the vehicle 2 again, the user is unable to grasp the parking position of the vehicle 2. In such a case, the user is supposed to use the vehicle position guidance system 1 so that the user is guided to the parking position of the vehicle 2.

Figure 4:
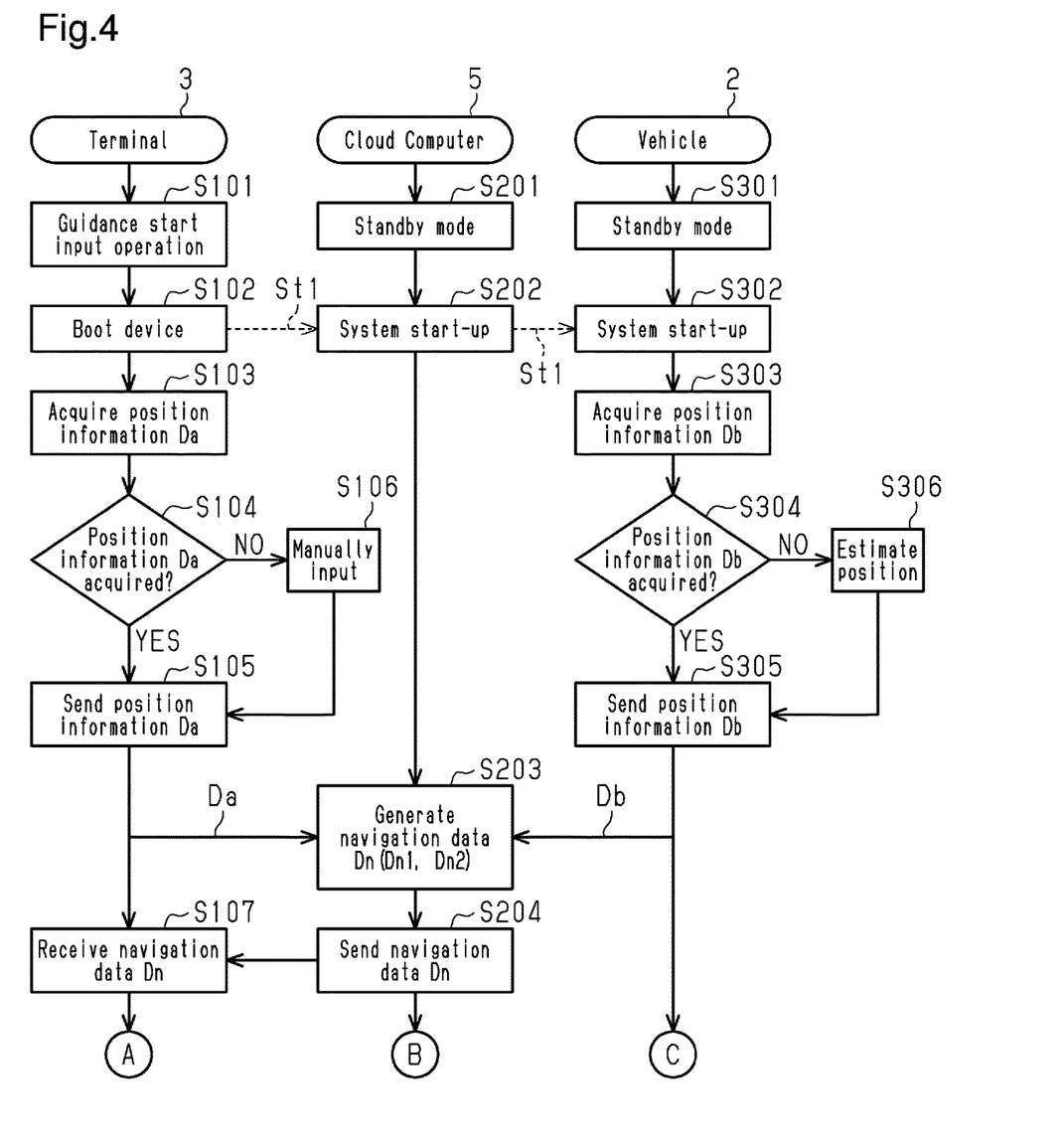
FIG. 4 is a flowchart illustrating the procedure for providing guidance to the parking position of the vehicle.

As shown in FIG. 4, when a guidance start input operation is performed through, for example, a screen tap operation or a button operation, the terminal 3 detects the guidance start input operation (step 101). When detecting the guidance start input operation, the terminal 3 boots a device related to a vehicle position guidance in the terminal 3 and sends a notification indicating that the device has been booted (a device boot notification St1) to the cloud computer 5 through a network communication (step 102).

The cloud computer 5 normally enters a standby mode to wait for being accessed from the terminal 3 (step 201). When receiving the device boot notification St1 in the standby mode, the cloud computer 5 boots and initiates system start-up (starts operating) (step 202).

The vehicle 2 normally enters a standby mode to wait for being accessed from the cloud computer 5 (step 301). When receiving the device boot notification St1 via the cloud computer 5 in the standby mode, the vehicle 2 gets activated to initiate system start-up (starts operating) (step 302).

After booting the device in the terminal 3, the terminal position measurement section 22 measures the position of the terminal 3 to acquire the position information Da of the terminal 3 (step 103). The terminal position measurement section 22 simply needs to measure its own position using at least one of the GPS 16 and near-field communication via a wireless LAN. Thus, even if, for example, the terminal 3 cannot acquire radio waves of the GPS 16 in a building, the position of the terminal 3 can be measured through near-field communication such as Wi-Fi communication.

When performing the acquiring operation of the position information Da, the terminal position measurement section 22 determines whether the terminal position measurement section 22 has acquired the position information Da (step 104). When the terminal position measurement section 22 has acquired the position information Da, the terminal position measurement section 22 sends the position information Da to the cloud computer 5 through a network communication (step 105). When the terminal position measurement section 22 has not acquired the position information Da, the terminal position measurement section 22 causes the user to manually input the current position (step 106). Then, the terminal position measurement section 22 sends, to the cloud computer 5 through a network communication, the position information Da that has been acquired through the manual inputting. Thus, even if the position information Da cannot be acquired through communication, the guidance to the position of the parked vehicle 2 can be hastily started. It is preferred that the position information Da be modified at the point in time when the position information Da is measured through communication even if the position information Da was not initially measured through communication.

Subsequent to the system start-up in the vehicle 2, the vehicle position measurement section 23 measures the position of the vehicle 2 to acquire the position information Db of the vehicle 2 (step 303). The vehicle position measurement section 23 simply needs to measure its own position using at least one of the GPS 11 and near-field communication via a wireless LAN. Thus, even if, for example, the vehicle 2 cannot acquire radio waves of the GPS 11 in a building, the position of the vehicle 2 can be measured through near-field communication such as Wi-Fi communication.

When performing the acquiring operation of the position information Db, the vehicle position measurement section 23 determines whether the vehicle position measurement section 23 has acquired the position information Db (step 304). When the vehicle position measurement section 23 has acquired the position information Db, the vehicle position measurement section 23 sends the position information Db to the cloud computer 5 through a network communication (step 305). When the vehicle position measurement section 23 has not acquired the position information Db, the vehicle position measurement section 23 estimates its own position from the information related to the automatic parking (step 306). The position of the vehicle 2 can be estimated using, for example, an output of a vehicle on-board gyro sensor or the distance of movement from the point in time at which radio waves of the GPS 11 could not be obtained. Then, the vehicle position measurement section 23 sends, to the cloud computer 5 through a network communication, the position information Db that has been acquired through the position estimation.

Using the position information Da received from the terminal 3 and the position information Db received from the vehicle 2, the calculator 24 generates navigation data Dn as data related to the route R for the user to reach the parked vehicle 2 (step 203). The navigation data Dn includes not only a course generated by avoiding an obstacle (for example, a building) but also the distance between the vehicle 2 and the terminal 3 as connected by a straight line. In addition to the above-described route R, the navigation data Dn may include the time required for the user to reach the vehicle.

Figure 3A:
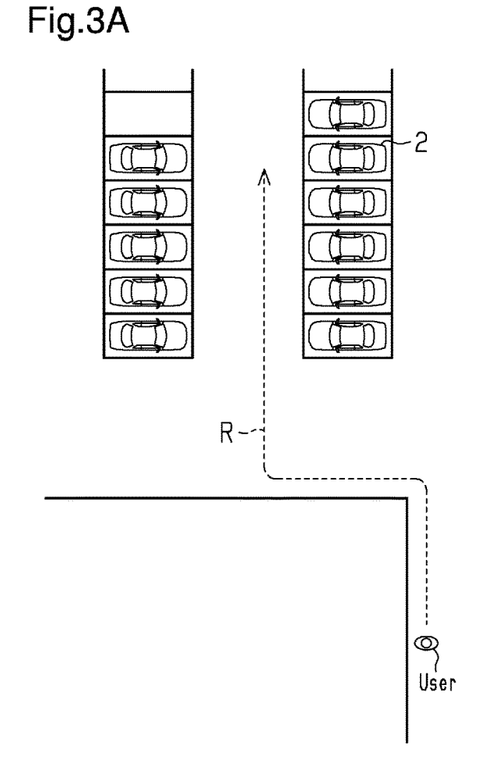
FIG. 3A is a diagram illustrating the user moving toward the parking position of the vehicle by himself or herself.
Figure 3B:
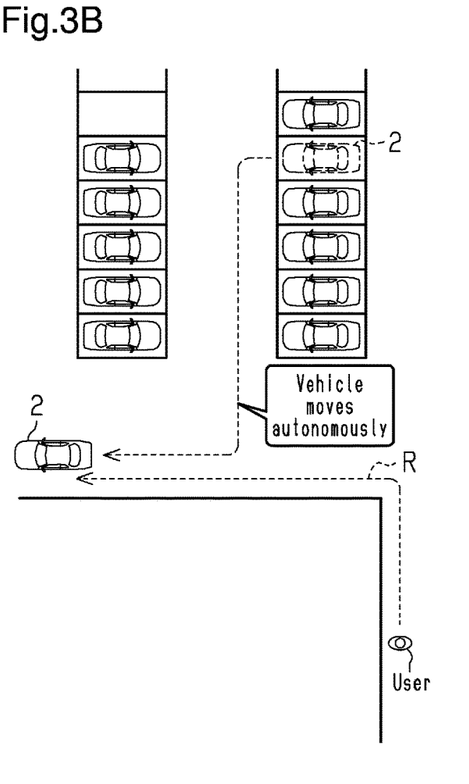
FIG. 3B is a diagram illustrating the user entering the vehicle by causing the vehicle to automatically travel to an entering position designated by the user.

FIGS. 3A and 3B show examples of assumed patterns of entering the vehicle 2. In FIG. 3A, the user moves toward the parking position of the vehicle 2 by himself or herself. In FIG. 3B, automatic travel of the vehicle 2 to a designated entering position (a position where the user gets in and out of the vehicle 2) is performed so that the user enters the vehicle 2 at that location. Accordingly, the calculator 24 of the present embodiment generates two types of navigation data, namely, navigation data Dn1 in a case where the user directly moves toward the parking position of the vehicle 2 and navigation data Dn2 in a case of moving toward an entering position designated by the user.

Referring back to FIG. 4, the calculator 24 sends the generated navigation data Dn (Dn1, Dn2) to the terminal 3 through a network communication (step 204). The navigation data Dn (Dn1, Dn2) sent from the cloud computer 5 to the terminal 3 simply needs to be a data group notifying the user of, for example, the route R or the required time in a simplified manner on the terminal 3.

When the navigation data Dn is sent from the cloud computer 5 via a network, the guide 25b of the terminal 3 receives the navigation data Dn (step 107). In the present embodiment, when receiving the navigation data Dn, the guide 25b of the terminal 3 displays the introduction (simplified data) of the navigation data Dn. When multiple types of the navigation data Dn (two types of data, namely, Dn1, Dn2 in the present embodiment) exist, for example, as the introduction (simplified data) of the navigation data, a simplified route or required time is displayed on the screen so that the user selects and designates the navigation data Dn. For example, the screen of the terminal 3 displays the pattern in which the user directly moves toward the parking position of the parked vehicle 2 ("walk to parking position" as shown in FIG. 3A) and the pattern in which automatic travel of the vehicle 2 to a designated entering position is performed so that the user moves toward the entering position ("walk to designated entering position" as shown in FIG. 3B). In this case, the user selects one of the two patterns.

Figure 5:
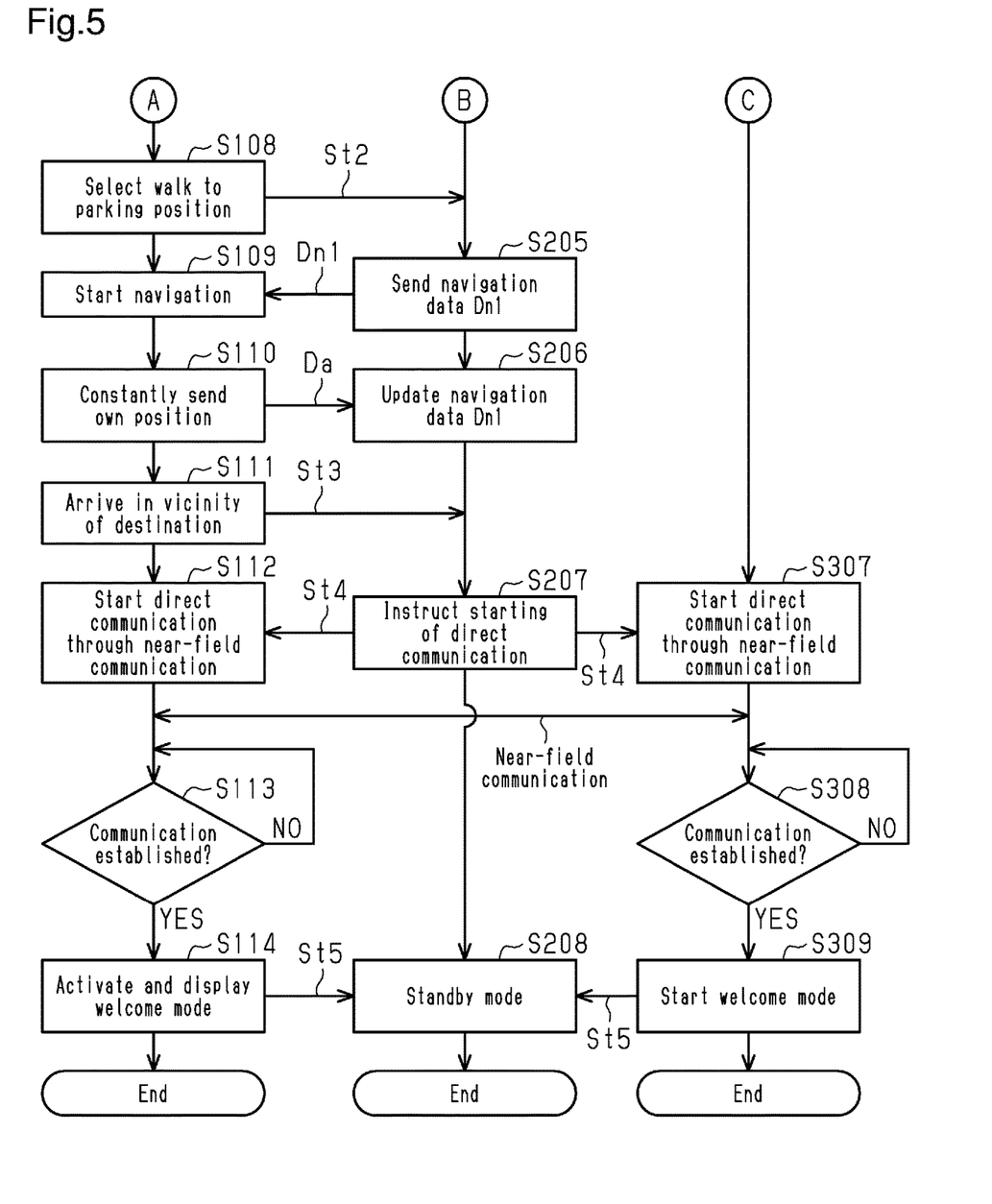
FIG. 5 is a flowchart illustrating the steps subsequent to the procedure in FIG. 4.

FIG. 5 is a flowchart illustrating the operation of route guidance executed when the user directly moves toward the parking position of the parked vehicle 2. When "walk to parking position" is selected in the terminal 3, the terminal 3 inputs the operation of that selection (step 108). Then, the guide 25b of the terminal 3 sends a notification indicating that "walk to parking position" has been selected (parking position selection notification St2) to the cloud computer 5 through a network communication.

When receiving the parking position selection notification St2, the guide 25a of the cloud computer 5 sends the navigation data Dn corresponding to the parking position selection notification St2 (the navigation data Dn1 in the case of directly moving toward the parked vehicle 2) to the terminal 3 through a network communication (step 205). In the present embodiment, the guide 25a sends the data group needed to perform a detailed route guidance to the parking position, as the navigation data Dn1 of the position guidance selected by the user.

When receiving the navigation data Dn1 from the cloud computer 5, the guide 25b of the terminal 3 uses the navigation data Dn1 to start the route guidance for the user to reach the parking position (step 109). At this time, the distance between the parked vehicle 2 and the terminal 3 is still long. When the distance on the route R between the parked vehicle 2 and the terminal 3 is greater than or equal to a predetermined value, the guide 25b provides guidance of the route R to the parked vehicle 2 by performing the first guidance (i.e., rough guidance using the terminal 3).

Figure 6:
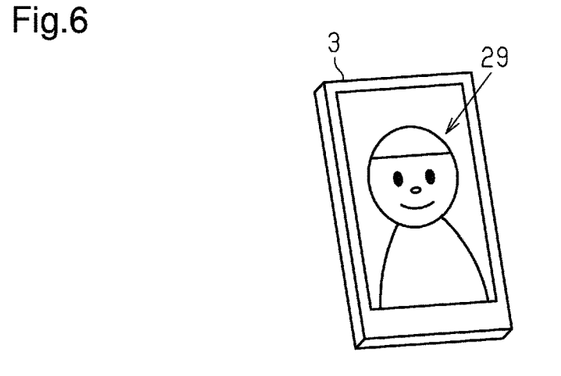
FIG. 6 is a schematic diagram showing an example of a first guidance.

FIG. 6 shows an example in which the route guidance (first guidance) is started in the terminal 3. As shown in FIG. 6, when the route guidance (first guidance) is started, the guide 25b of the terminal 3 displays on the screen of the terminal 3 a guide image 29, which assists the route guidance. The guide image 29 is preferably, for example, an image that displays a character set by the user or a person imitating the feature of the user in association with a parking lot guide (a concierge on the screen).

Figure 7:
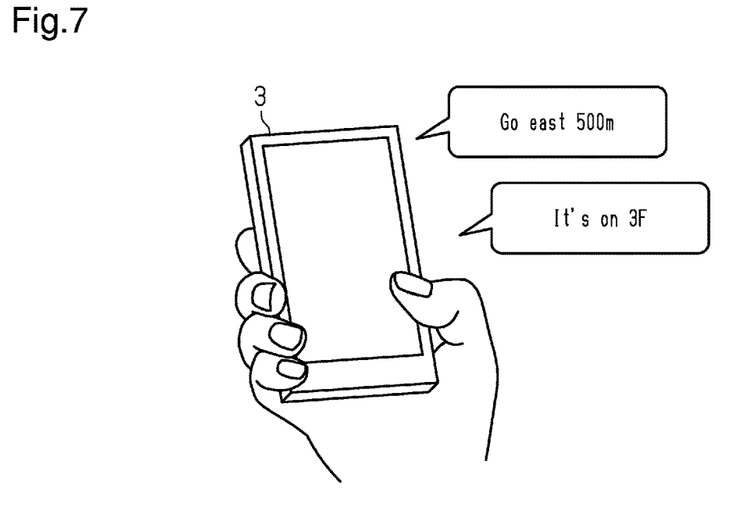
FIG. 7 is a schematic diagram showing an example of a second guidance.

As shown in FIG. 7, the first guidance is executed through a sound notification or a screen display in the terminal 3. For example, it is preferred in the first guidance that the guide image 29 displayed on the screen of the terminal 3 serve as a concierge to inform the user of a destination. In the example of FIG. 7, guidance is conducted with a sound notification informing the user of, for example, a travel direction (north, south, east, and west; and left and right) or a distance (meter). In the first guidance, for example, a map may be displayed on the screen of the terminal 3 so that the map is used together. Additionally, when the parked vehicle 2 is parked in a parking garage, the first guidance indicates on which floor the parked vehicle 2 is located.

Referring back to FIG. 5, during the parking position guidance, the terminal position measurement section 22 constantly measures its own position to send the position information Da to the cloud computer 5 through a network communication (step 110). Using the position information Da received constantly from the terminal 3, the calculator 24 updates the navigation data Dn1 (step 206). Since the user is moving toward the parked vehicle 2, the remaining distance to the parked vehicle 2 is successively changing. Thus, the calculator 24 successively monitors the position of the terminal 3 to update the navigation data Dn1 and causes the guide 25b to execute the guidance using the updated navigation data Dn1. Accordingly, the position guidance by the terminal 3 is successively updated.

When determining, by using the remaining distance to the parking position on the route R, that the user has arrived in the vicinity of the destination, the guide 25b of the terminal 3 sends a notification indicating the arrival (destination vicinity arrival notification St3) to the cloud computer 5 through a network communication (step 111). When receiving the destination vicinity arrival notification St3 from the terminal 3, the guide 25a of the cloud computer 5 sends an instruction of starting near-field communication (Bluetooth communication in this example) to both the vehicle 2 and the terminal 3 through a network communication (step 207). This instruction is referred to as a near-field communication starting instruction St4.

When receiving the near-field communication starting instruction St4 from the cloud computer 5, the guide 25b of the terminal 3 starts near-field communication (step 112). In the same manner, when receiving the near-field communication starting instruction St4 from the cloud computer 5, the guide 25c of the vehicle 2 starts near-field communication (step 307).

After starting near-field communication with the vehicle 2, the guide 25b of the terminal 3 determines whether the near-field communication has been established (step 113). When the near-field communication with the vehicle 2 has been established, the guide 25b activates and displays a welcome mode for the terminal 3 as the second guidance for the terminal 3 (step 114). In the activating display of the welcome mode for the terminal 3, for example, the above-described guide image 29 preferably displays a notification with a sound or a screen that switching to the second guidance has occurred.

After starting near-field communication with the terminal 3, the guide 25c of the vehicle 2 determines whether the near-field communication has been established (step 308). When the near-field communication with the terminal 3 has been established, the guide 25c starts (activates) a welcome mode for the vehicle 2 as the second guidance for the vehicle 2 (step 309).

Figure 8:
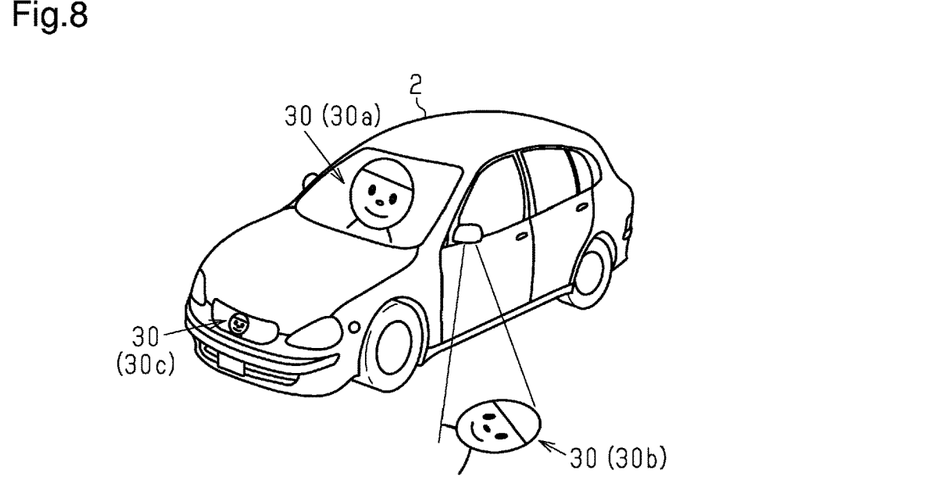
FIG. 8 is a schematic diagram showing an example of the second guidance.

FIG. 8 shows an example of the second guidance executed in the vehicle 2. As shown in FIG. 8, the guide 25c of the vehicle 2 projects an image using the vehicle on-board device 4 as the welcome mode of the vehicle 2. The image projected by the vehicle on-board device 4 (projected image 30) is preferably, for example, an image associated with the terminal 3 (such as an image similar to the guide image 29). In this case, the vehicle on-board device 4 is preferably a projector capable of projecting an image on or around the vehicle 2. Examples of the projected image 30 include an image 30a, which is projected onto the front glass of the vehicle body, an image 30b, which is projected onto a road surface from a part of the vehicle body (the side mirror on the exterior of the vehicle in the example of FIG. 8), and an image 30c, which is projected onto the front grille of the vehicle body. Thus, the noticeability of the second guidance allows the user to immediately recognize the vehicle 2 of the user.

Referring back to FIG. 5, the guide 25a of the cloud computer 5 returns to the original standby mode when receiving a notification indicating that the welcome mode has been started (second guidance start notification St5) from both the vehicle 2 and the terminal 3 through a network communication. When the guide 25c of the vehicle 2 confirms that the vehicle door (not shown) has been unlocked during the execution of the second guidance, the guide 25c of the vehicle 2 ends the second guidance performed by the vehicle on-board device 4. Further, the guide 25b of the terminal 3 ends the second guidance in the terminal 3 when receiving a guidance end notification sent from the vehicle 2 that has ended the second guidance through near-field communication.

Figure 9:
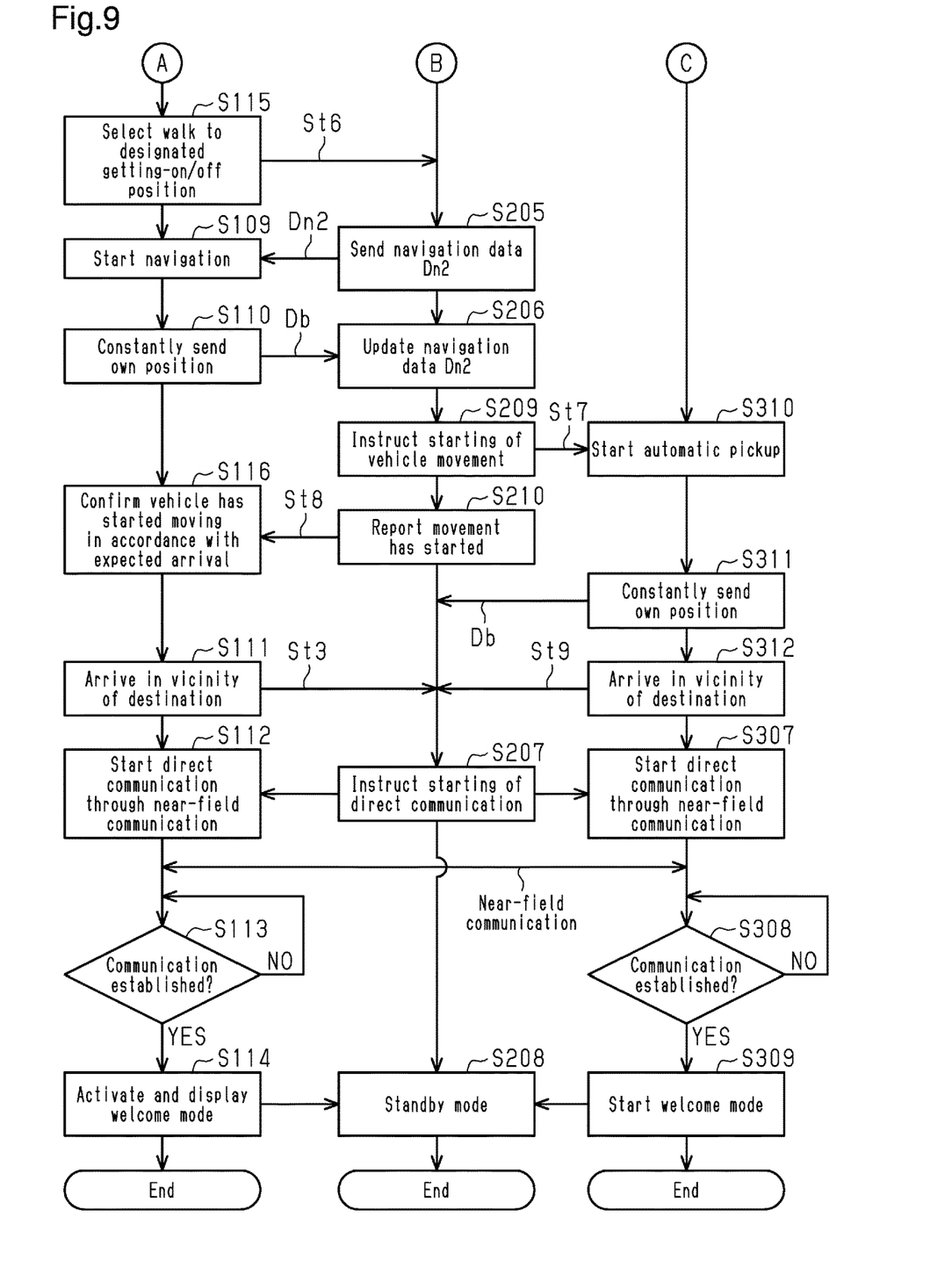
FIG. 9 is a flowchart illustrating the steps subsequent to the procedure in FIG. 4.

FIG. 9 is a flowchart illustrating the operation of route guidance executed when automatic travel of the parked vehicle 2 to the entering position designated by the user is performed so that the user enters the vehicle 2. When "walk to designated entering position" is selected in the terminal 3, the guide 25b of the terminal 3 inputs the operation of that selection (step 115). Then, the guide 25b of the terminal 3 sends a notification indicating that "walk to designated entering position" has been selected (designated entering position selection notification St6) to the cloud computer 5 through a network communication.

When receiving the designated entering position selection notification St6, the guide 25*a* of the cloud computer 5 sends the navigation data Dn corresponding to the designated entering position selection notification St6 (the navigation data Dn2 in the case of moving toward the designated entering position) to the terminal 3 through a network communication (step 205). In the present embodiment, the guide 25*a* sends the data group needed to perform a detailed route guidance to the designated entering position, as the navigation data Dn2 of the position guidance selected by the user.

When receiving the navigation data Dn2 from the cloud computer 5, the guide 25*b* of the terminal 3 uses the navigation data Dn2 to execute the route guidance for the user to reach the designated entering position (step 109). At this time, the distance between the designated entering position and the terminal 3 is still long. When the distance on the route R between the designated entering position and the terminal 3 is greater than or equal to a predetermined value, the guide 25*b* provides guidance of the route R to the designated entering position by performing the first guidance (i.e., rough guidance using the terminal 3). The first guidance executed at this time is the same as the first guidance executed in the case of directly moving toward the parking position, and thus will not be described in detail.

When automatic travel of the vehicle 2 to the designated entering position is performed so that the user enters the vehicle 2, the constant sending of the own position of the terminal 3 and the updating of the navigation data Dn2 are successively executed in the same manner as the case where the user moves toward the parking position by himself or herself (steps 110, 206). Thus, even when the user moves toward a designated entering position, an optimal route guidance corresponding to the movement distance can be executed.

Figure 10A:
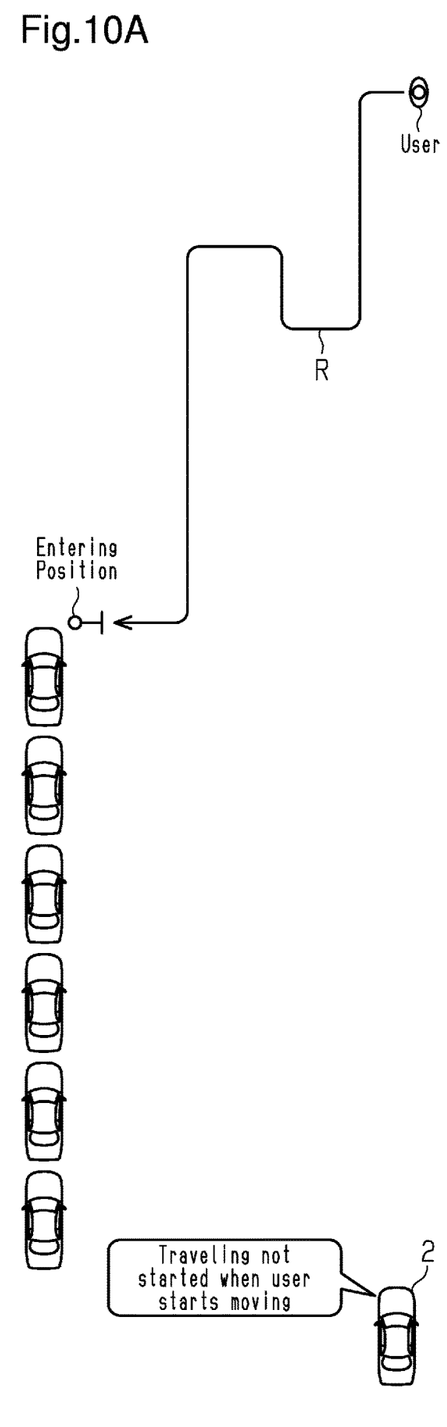
FIGS. 10A and 10B are diagrams illustrating a case where the automatic travel of the parked vehicle is started in accordance with the time at which the user will reach the entering position.
Figure 10B:
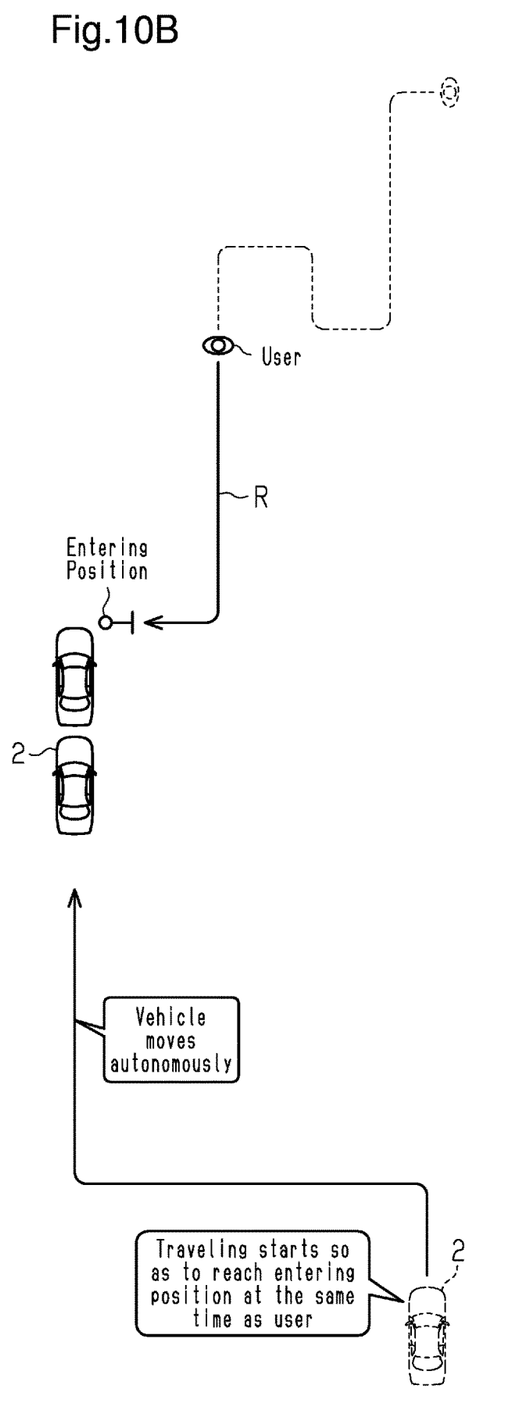

As shown in FIG. 10A, during the use of the route guidance, there is a possibility that another vehicle has already parallel-parked at the entering position (a place where the user gets in and out of the vehicle 2) designated by the user. At this time, if the vehicle 2 of the user is moved to the entering position immediately after the guidance is started, the vehicle 2 reaches the entering position before the user reaches the entering position. This may promote parallel parking. To solve this problem, as shown in FIG. 10B, the vehicle 2 is set to reach the entering position at the same time as the user. This leads to an advantage of preventing the vehicle 2 from being parallel-parked.

Referring back to FIG. 9, the operating section 26 of the cloud computer 5 identifies the time at which the user will reach the entering position and sends an instruction for a vehicle movement start for the vehicle 2 so as to reach the entering position at that time (vehicle movement start instruction St7) to the parked vehicle 2 through a network communication (step 209). When receiving the vehicle movement start instruction St7 from the cloud computer 5, the guide 25*c* of the vehicle 2 starts automatic pickup at the time based on the vehicle movement start instruction St7 (step 310). In this manner, the starting of the automatic pickup of the vehicle 2 is adjusted such that the vehicle 2 reaches the entering position at the same time as the user.

After outputting the vehicle movement start instruction St7 to the vehicle 2, the operating section 26 of the cloud computer 5 sends a report indicating that the parked vehicle 2 has started moving toward a designated entering position (vehicle movement start report St8) to the terminal 3 through a network communication (step 210). When receiving the vehicle movement start report St8 from the cloud computer 5, the guide 25*b* of the terminal 3 confirms that the movement of the vehicle 2 has been started in accordance with the expected arrival of the user at the entering position (step 116). That is, the guide 25*b* notifies the user via the terminal 3 that the vehicle 2 will arrive at the entering position at the expected time at which the user will arrive at the entering position. This allows the user to recognize that the parked vehicle 2 has started moving toward the entering position and judge that he or she may continue to walk to the entering position.

During the automatic pickup, the vehicle position measurement section 23 constantly measures its own position to send the position information Db to the cloud computer 5 through a network communication (step 311). Thus, the guide 25*a* of the cloud computer 5 uses the position information Db acquired from the vehicle 2 to constantly monitor whether the vehicle 2 is correctly moving toward the designated entering position.

When determining using the remaining distance to the parking position on the route R that the user has arrived in the vicinity of the destination, the guide 25*c* of the vehicle 2 sends a notification indicating the arrival (destination vicinity arrival notification St9) to the cloud computer 5 through a network communication (step 312). When receiving the destination vicinity arrival notifications St3, St9 both from the vehicle 2 and the terminal 3, the guide 25*a* of the cloud computer 5 sends an instruction or a request for starting near-field communication (for example, Bluetooth communication) to both the vehicle 2 and the terminal 3 through a network communication (step 207). This establishes the near-field communication between the vehicle 2 and the terminal 3 that are located close to each other.

Thereafter, in the same manner as when the user directly moves to the parked vehicle 2, the second guidance is executed using the vehicle on-board device 4. This allows the user to immediately recognize the vehicle 2 that has reached the entering position. Accordingly, even if the vehicle 2 is parallel-parked at the entering position, the user immediately recognizes which vehicle 2 belongs to the user.

As described above, in the present embodiment, guidance to the parking position of the vehicle 2 is provided by selectively performing the first guidance or the second guidance depending on whether the distance is long or short between the terminal 3 carried by the user and the vehicle 2. This allows for a proper guidance corresponding to the distance between the vehicle 2 and the terminal 3 when providing guidance to the parking position of the vehicle 2. Accordingly, proper guidance to the vehicle position is achieved.

After the user gets out of the vehicle 2, the vehicle 2 autonomously locates the parking position and automatically travels to the parking position to proceed with parking. In a case where the vehicle 2 autonomously travels to locate the parking position and park itself through automatic travel after the user gets out of the vehicle 2, the user is unable to recognize the parking position when attempting to return to the parked vehicle 2. However, the first guidance and the second guidance allow the user to reach the parking position of the vehicle 2.

The terminal position measurement section 22 and the vehicle position measurement section 23 measure their own positions using at least one of the network communication via a wireless LAN and the global positioning system (GPS 11, 16) that measures the position using radio waves from the satellite 10. Thus, the positions of the vehicle 2 and the terminal 3 are accurately measured using the global positioning system (GPS 11, 16). Even if the vehicle 2 and the terminal 3 are located at the position where radio waves of the global positioning system (GPS 11, 16) cannot be received, the positions can be identified through the network communication via a wireless LAN (for example, Wi-Fi communication). This is advantageous for correctly measuring the current positions of the vehicle 2 and the terminal 3.

The vehicle position guidance system 1 includes the operating section 26, which causes the parked vehicle 2 to automatically travel to an entering position designated by the user. For the user to enter the vehicle, the operating section 26 obtains a route to the entering position and guides the user to the entering position in accordance with the route. The user enters the vehicle 2 by designating the entering position of the vehicle 2 and causing the vehicle 2 to automatically travel to the entering position. This ensures the convenience for the user to enter the vehicle 2.

The operating section 26 obtains an expected time at which the user will reach the entering position and causes the vehicle 2 to automatically travel in accordance with the expected time. Thus, the time at which the parked vehicle 2 will reach the entering position can be adjusted to the time at which the user will reach the entering position. If, for example, the parked vehicle 2 reaches the entering position before the user reaches the entering position, the vehicle 2 has to wait for some time, thereby resulting in the formation of the queue of the vehicles 2. The occurrence of such a situation is limited in the present embodiment.

The first guidance is provided by at least one of a sound notification and a screen display in the terminal 3. Thus, the use of a sound notification or a screen display in the terminal 3 allows the user to be readily notified of the approximate position of the parked vehicle 2.

The second guidance is provided through the projection of an image (the projected image 30) using the vehicle on-board device 4. Thus, since the projected image of the vehicle on-board device 4 of the vehicle 2 allows its own position to become noticeable, the user immediately recognizes the vehicle position.

The guide 25 checks whether the near-field communication between the vehicle 2 and the terminal 3 is established. When the near-field communication is established, the guide 25 performs the second guidance to execute guidance by projecting an image with the vehicle on-board device 4. Thus, the second guidance is executed when the vehicle 2 and the terminal 3 are located close to each other such that the near-field communication between the vehicle 2 and the terminal 3 is established. Accordingly, the second guidance is executed in an optimal situation where the user has arrived in the vicinity of the vehicle 2.

The projected image 30 provided by the vehicle on-board device 4 associates the vehicle 2 and the terminal 3 with each other. Thus, the unique projected image 30 set for each user is displayed. This is advantageous in allowing the user to readily find the parked vehicle 2.

The vehicle position guidance system 1 may include a registration section 35 (refer to FIG. 1), which manages the registration of the projected image 30 by the user. When the user wants to register the projected image 30, the user notifies the cloud computer 5 of it. When receiving a projected image change request from the terminal 3, the registration section 35 permits a change input of the projected image 30. This causes the user to select the projected image 30 using the terminal 3 (or a device, such as a car navigation system of the vehicle 2) and set the selected projected image 30 as a new projected image 30. Thus, the user is able to set, for the vehicle on-board device 4, an image that he or she wants to project. Additionally, the projected image 30 can be updated on a regular basis.

The above-described embodiment may be modified as follows. The above-described embodiment and the following modifications can be combined as long as the combined modifications remain technically consistent with each other.

The positions of the vehicle 2 and the terminal 3 may be measured using various types of communication, such as GPS, Wi-Fi, 4G, 5G, and Bluetooth. Thus, various types of communication are applicable to a network communication.

The navigation data Dn to be generated is not limited to two types of navigation data Dn (Dn1, Dn2) as described in the above-described embodiment. Instead, three or more types of navigation data Dn may be provided by generating various assumed routes.

The calculator 24 does not have to be arranged in the cloud computer 5. Instead, the calculator 24 may be arranged in, for example, the vehicle 2 or the terminal 3.

Even when the terminal 3 is located close to the vehicle 2, the first guidance may be continued if it is difficult for the user to find the vehicle 2 because a building or the like blocks his or her view. In contrast, even when the terminal 3 is located far from the vehicle 2, the first guidance may be executed if there is no obstacle and thus the user can immediately find the vehicle 2.

The first guidance is not limited to, for example, a rough guidance. The first guidance simply needs to provide route guidance using the terminal 3 carried by the user.

While the user is walking toward the parking position of the vehicle 2, the user may be able to switch to an operation of entering the vehicle 2 at a designated entering position. This improves the convenience for the user.

In the second guidance, an image does not have to be projected onto the vehicle body or the glass surface. Instead, an image may be projected onto another location.

When the vehicle 2 and the terminal 3 are capable of directly communicating with each other, various types of services may be provided through the use of, for example, a video registered in a vehicle on-board video playing system, a speaker in the vehicle 2, and a speaker in the terminal 3. Examples of the service include playing a welcome video, unlocking a door, reciting a schedule, setting the navigation for the next destination, and starting the air conditioning in the vehicle. Additionally, an image captured by a camera in the vehicle 2 may be transferred to the terminal 3 so that the user can see the image of the surroundings of the vehicle 2 or check how congested the surroundings of the vehicle are.

The cloud computer 5 may notify the vehicle 2 and the terminal 3 through a network communication that near-field communication has been started.

The second guidance is preferably, for example, signage having such originality that the guidance does not bother someone. In this case, eye-catching signage may be newly shown when the user is approaching the vehicle 2.

The second guidance does not have to be executed through direct communication between the vehicle 2 and the terminal 3. Instead, for example, the second guidance may be executed by the cloud computer 5 through a network communication.

The second guidance is not limited to a visual notification and may be a sound notification. Alternatively, the second guidance may be a combination of a visual notification and a sound notification.

In the second guidance, the vehicle 2 simply needs to inform the user of its own position through, for example, a notification using the vehicle on-board hazard lights or lamps.

The terminal 3 is not limited to a multi-functional mobile phone. Instead, for example, the terminal 3 may be Smart Key (registered trademark) for the vehicle 2 or a wireless key (mechanical key) with a screen.

The controller 9, which manages the vehicle position guidance system 1 in the vehicle 2, may be, for example, a portable terminal.

The vehicle position guidance system 1 does not have to include the operating section 26. That is, the vehicle position guidance system 1 does not have to include the function to cause the vehicle 2 to autonomously travel to the parking position through automatic travel after the user gets out of the vehicle 2.

The vehicle 2 is not limited to a gasoline vehicle. Instead, the vehicle 2 may be, for example, a hybrid vehicle, an electric vehicle, or a fuel-cell vehicle.

The invention claimed is:

1. A vehicle position guidance system that guides a user to a position of a parked vehicle, the vehicle position guidance system comprising:
    a terminal position measurement section that measures a position of a terminal carried by the user;
    a vehicle position measurement section that measures the position of the parked vehicle;
    a calculator that obtains a route for the user to reach the parked vehicle using position information related to the terminal measured by the terminal position measurement section and position information related to the parked vehicle measured by the vehicle position measurement section; and
    a guide that assists the user in entering the vehicle by selectively using a first guidance and a second guidance depending on whether a distance is long or short between the terminal and the parked vehicle on the route that has been obtained by the calculator, wherein
    the first guidance provides guidance to the position of the parked vehicle using the terminal, and
    the second guidance provides guidance to the position of the parked vehicle through a notification using a vehicle on-board device of the parked vehicle.

2. The vehicle position guidance system according to claim 1, wherein, after the user gets out of the vehicle, the vehicle autonomously locates a parking position and automatically travels to the parking position to proceed with parking.

3. The vehicle position guidance system according to claim 1, wherein the terminal position measurement section and the vehicle position measurement section measure their own positions using at least one of a network communication via a wireless LAN or a global positioning system that measures a position using radio waves from a satellite.

4. The vehicle position guidance system according to claim 1, comprising an operating section that causes the parked vehicle to automatically travel to an entering position of the parked vehicle when the entering position is designated, wherein
    the calculator obtains a route to the entering position designated by the user, and
    the guide guides the user to the entering position in accordance with the route to the entering position.

5. The vehicle position guidance system according to claim 4, wherein the operating section obtains an expected time at which the user will reach the entering position and causes the vehicle to automatically travel in accordance with the expected time.

6. The vehicle position guidance system according to claim 1, wherein the first guidance is provided by at least one of a sound notification or a screen display in the terminal.

7. The vehicle position guidance system according to claim 1, wherein the second guidance is provided through projection of an image using the vehicle on-board device.

8. The vehicle position guidance system according to claim 7, wherein the guide checks whether near-field communication between the vehicle and the terminal is established and performs, when the near-field communication is established, the second guidance to execute guidance through the projection of the image using the vehicle on-board device.

9. The vehicle position guidance system according to claim 7, wherein the projected image provided by the vehicle on-board device associates the terminal and the vehicle with each other.

10. The vehicle position guidance system according to claim 7, comprising a registration section that manages registration of the projected image by the user.

11. A vehicle position guidance method that guides a user to a position of a parked vehicle, the vehicle position guidance method comprising:
    measuring a position of a terminal carried by the user;
    measuring the position of the parked vehicle;
    obtaining a route for the user to reach the parked vehicle using measured position information related to the terminal and measured position information related to the parked vehicle; and
    assisting the user in entering the vehicle by selectively using a first guidance and a second guidance depending on whether a distance is long or short between the terminal and the parked vehicle on the calculated route, wherein
    the first guidance provides guidance to the position of the parked vehicle using the terminal, and
    the second guidance provides guidance to the position of the parked vehicle through a notification using a vehicle on-board device of the parked vehicle.

* * * * *